United States Patent
Beilstein (10) Patent No.: US 8,061,943 B1
(45) Date of Patent: Nov. 22, 2011

(54) LOAD LEVELER FOR DIFFERENT WIDTH OPEN SEMI-TRAILERS

(76) Inventor: Richard R. Beilstein, Cedarburg, WI (US)

( * ) Notice: Subject to any disclaimer, the term of this patent is extended or adjusted under 35 U.S.C. 154(b) by 339 days.

(21) Appl. No.: 12/419,435

(22) Filed: Apr. 7, 2009

Related U.S. Application Data (60) Provisional application No. 61/125,648, filed on Apr. 28, 2008.

(51) Int. Cl.
*B60P 7/08* (2006.01)
(52) U.S. Cl. ............................................. 410/90; 410/89
(58) Field of Classification Search ............... 410/32, 410/54, 56, 68, 31, 46, 57, 78, 128, 89, 91, 410/90, 35, 37, 36; 414/802, 801, 788.1; 220/1.5
See application file for complete search history.

(56) References Cited

U.S. PATENT DOCUMENTS

| | | | | |
|---|---|---|---|---|
| 3,800,712 A | * | 4/1974 | Krug, Jr. ......................... | 410/54 |
| 4,043,275 A | * | 8/1977 | Rochester, Jr. ................. | 410/97 |
| 4,624,446 A | * | 11/1986 | Gould .............................. | 254/88 |
| 5,538,376 A | * | 7/1996 | Borda .............................. | 410/99 |
| 6,109,844 A | * | 8/2000 | Nadherny et al. .............. | 410/34 |
| 6,585,466 B2 | * | 7/2003 | Zhan et al. ...................... | 410/116 |
| 7,305,923 B2 | * | 12/2007 | Creighton et al. ............. | 105/404 |

* cited by examiner

*Primary Examiner* — Glenn Dayoan
*Assistant Examiner* — Sunsurraye Westbrook
(74) *Attorney, Agent, or Firm* — Donald J. Ersler (57) ABSTRACT

A load leveler for different widths of open semi-trailers preferably includes a load support member, a plurality of vertical support members and two adjustable stakes. Each vertical support member is attached under the load support member. A stake receiver is preferably secured to each end of the load leveler with welding. The stake receiver is sized to receive an outer perimeter of the adjustable stake. The adjustable stake includes a receiver portion and a stake portion. The stake portion is sized to be received by a stake pocket in an open semi-trailer. The receiver portion is sized to be received by the stake receiver. At least one of the adjustable stake is fractionally rotated to accommodate different distances between stake pockets. A chain tie is preferably attached to a top of the stake receiver to retain a tie down chain.

18 Claims, 8 Drawing Sheets

LOAD LEVELER FOR DIFFERENT WIDTH OPEN SEMI-TRAILERS

CROSS-REFERENCES TO RELATED APPLICATIONS

This is a utility patent application taking priority from provisional application No. 61/125,648 filed on Apr. 28, 2008.

BACKGROUND OF THE INVENTION

1. Field of the Invention The present invention relates generally to load levelers and more specifically to a load leveler for different widths of open semi-trailers, which allows a single length of a load leveler to be used on open semi-trailers having different widths.

2. Discussion of the Prior Art

A load leveler is used to support loads on an open semi-trailer. Open semi-trailer types include flat-bed, low-boy, single-drop and double-drop. The load leveler includes two stakes that fit into two stake pockets formed in a bed of the semi-trailer. However, most open semi-trailers have different widths. The different widths of open semi-trailers result in varying distances between opposing stake pockets. A load leveler with a set distance between the stake pockets for one manufacturer of semi-trailers may not work for another manufacturer of open semi-trailers. Typically, the distance between stake pockets on the open semi-trailers has a range of between 97-98 includes.

Accordingly, there is a clearly felt need in the art for a load leveler for different widths of semi-trailers, which allows a single length of load leveler to be used on semi-trailers having different distances between stake pockets.

SUMMARY OF THE INVENTION

The present invention provides a load leveler for different widths of open semi-trailers, which allows a single length of load leveler for many different brands of open semi-trailers. The load leveler for different widths of open semi-trailers (load leveler) includes a load support member, a plurality of vertical support members and two adjustable stakes. Each vertical support member is preferably attached under the load support member with welding. A plurality of cross support members may be attached between two adjacent vertical support members to improve strength and rigidity of the load leveler.

A stake receiver is preferably secured to each end of the load leveler with welding. The stake receiver is preferably a tube and is sized to receive an outer perimeter the adjustable state. The adjustable stake includes a receiver portion and a stake portion. The stake portion is sized to be received by a stake pocket in an open semi-trailer. The receiver portion is sized to be received by the stake receiver. At least one adjustable stake is rotated 180 degrees to accommodate different distances between stake pockets. A chain tie is preferably attached to a top of the stake receiver to retain a tie down chain.

Accordingly, it is an object of the present invention to provide a load leveler, which allows a single length of load leveler to be used on semi-trailers having different distances between stake pockets.

These and additional objects, advantages, features and benefits of the present invention will become apparent from the following specification.

DETAILED DESCRIPTION OF THE PREFERRED EMBODIMENTS

Figure 1:
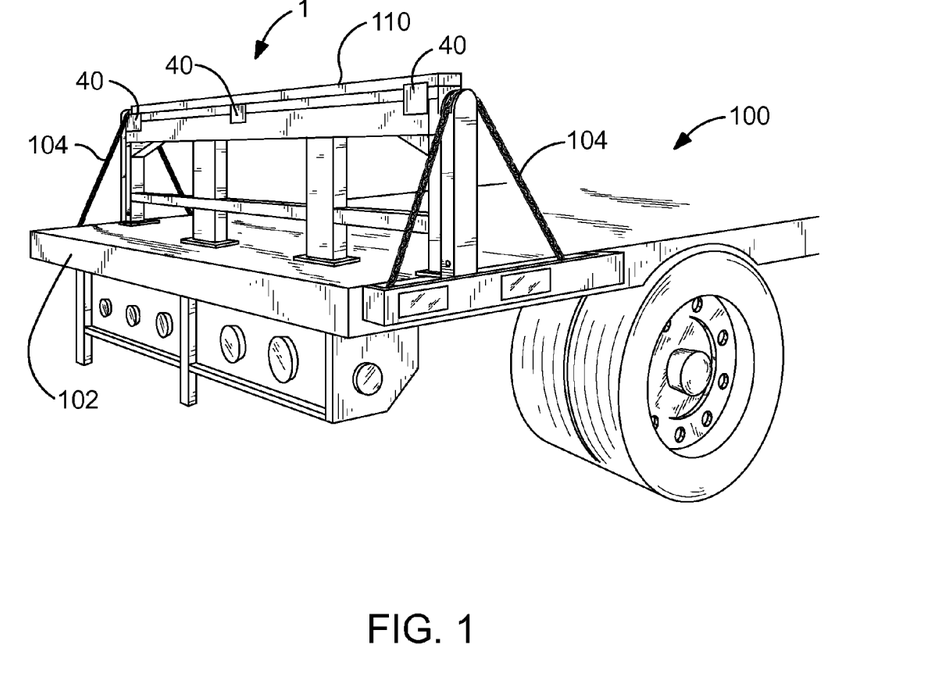
FIG. 1 is a perspective view of a load leveler secured to a bed of an open semi-trailer in accordance with the present invention.
Figure 4:
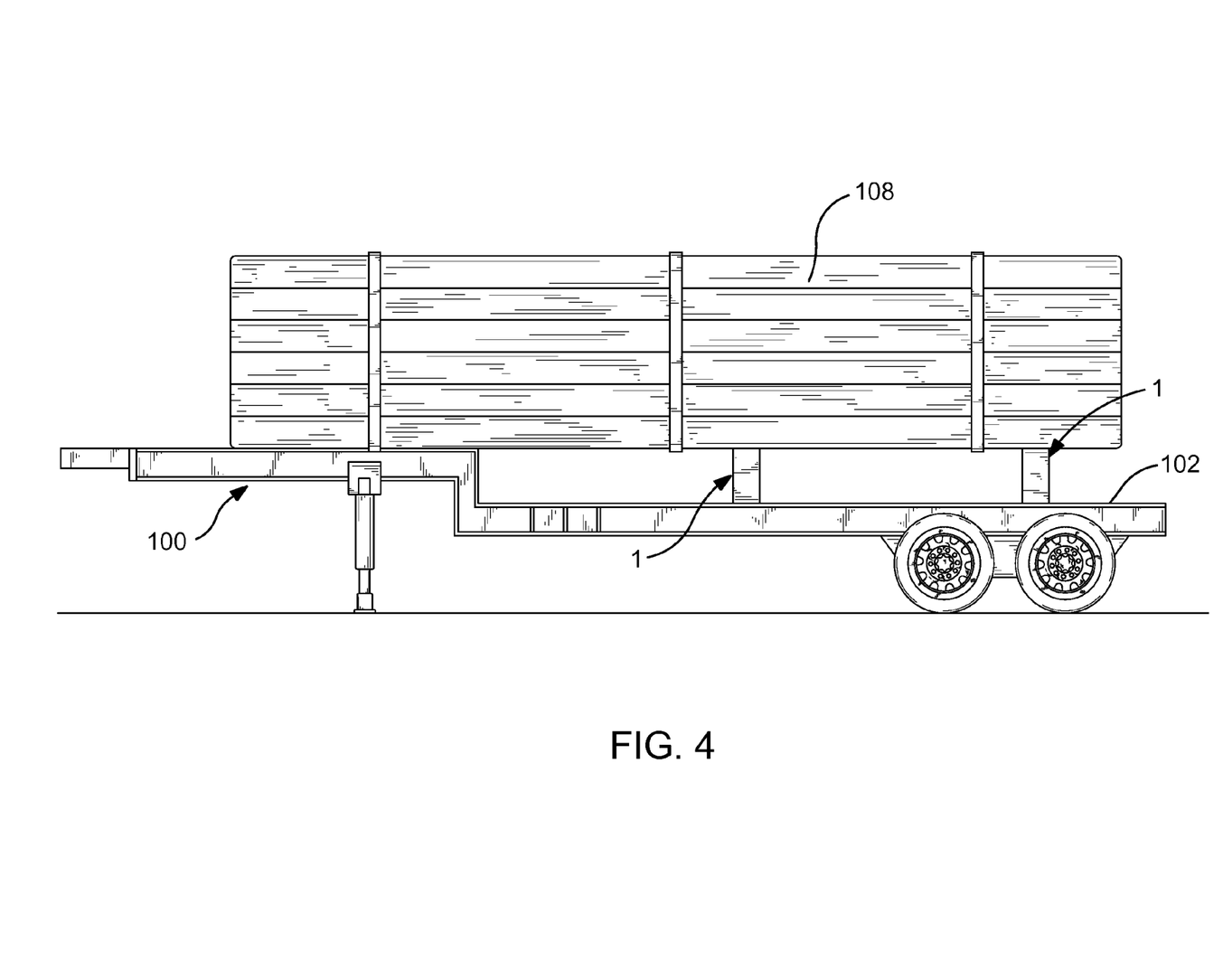
FIG. 4 is a side view of a single drop open semi-trailer with two load levers retained therein and supporting a load of poles in accordance with the present invention.
Figure 5:
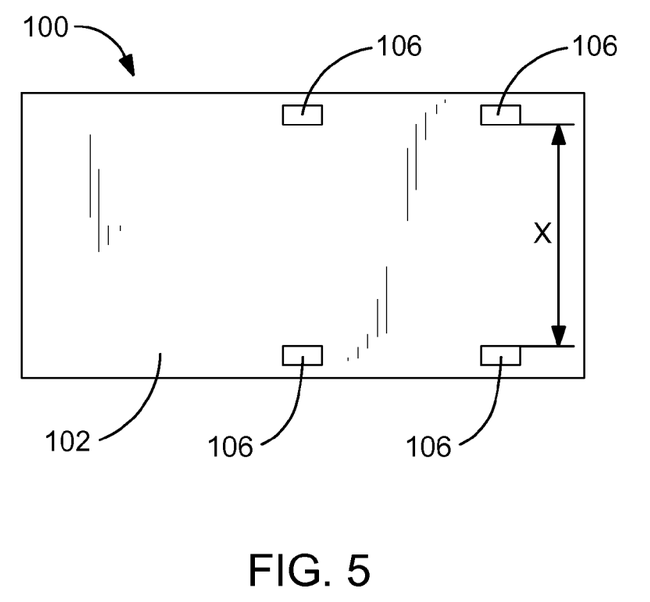
FIG. 5 is a top view of a open semi-trailer bed with four stake pockets in accordance with the present invention.

With reference now to the drawings, and particularly to FIG. 1, there is shown a perspective view of a load leveler 1 secured to an open semi-trailer 100. The load leveler 1 is secured to a top of the semi-trailer bed 102 with chains 104. With reference to FIG. 5, a plurality of stake pockets 106 are formed in the top of the semi-trailer bed 102. A distance between two opposing stake pockets 106 is defined by a distance X. Distance X has a range of between 97-98 inches, depending upon the manufacturer of the open semi-trailer. With reference to FIG. 4, a plurality of poles 108 are supported on the semi-trailer bed 102 and two load levers 1. The load levelers 1 are retained in the four stake pockets 106.

Figure 2:
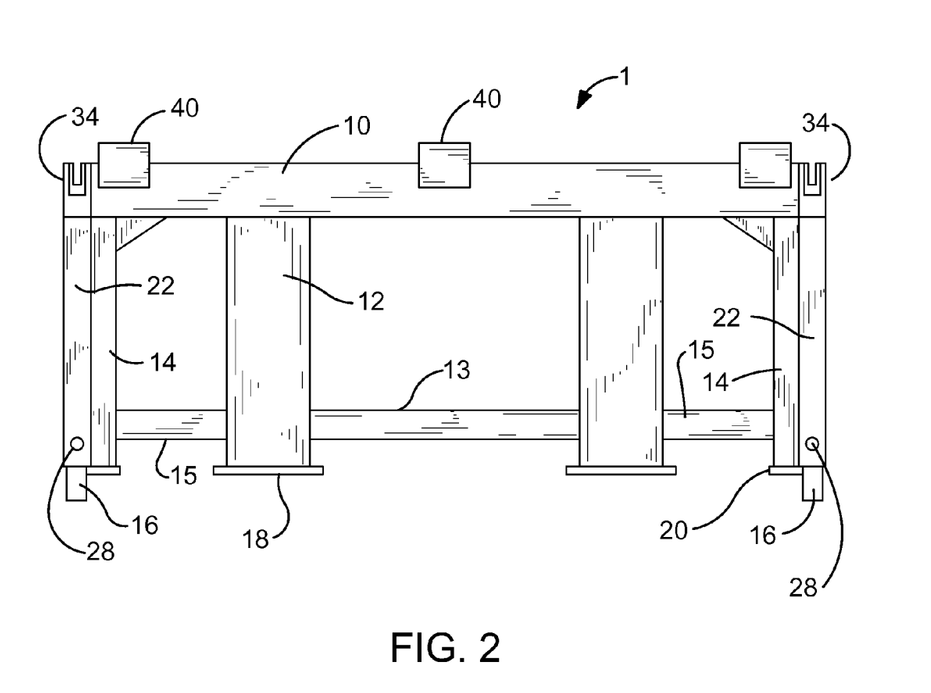
FIG. 2 is a front view of a load leveler in accordance with the present invention.
Figure 2A:
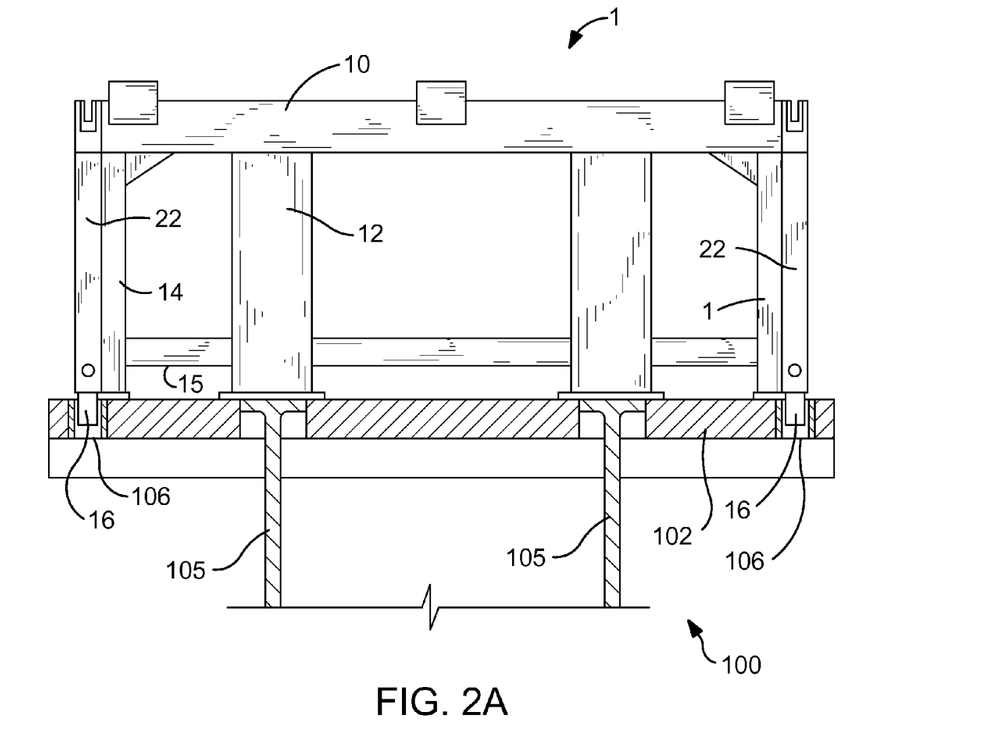
FIG. 2a is a front view of a load leveler resting on a cross sectional representation of a trailer bed in accordance with the present invention.
Figure 3:
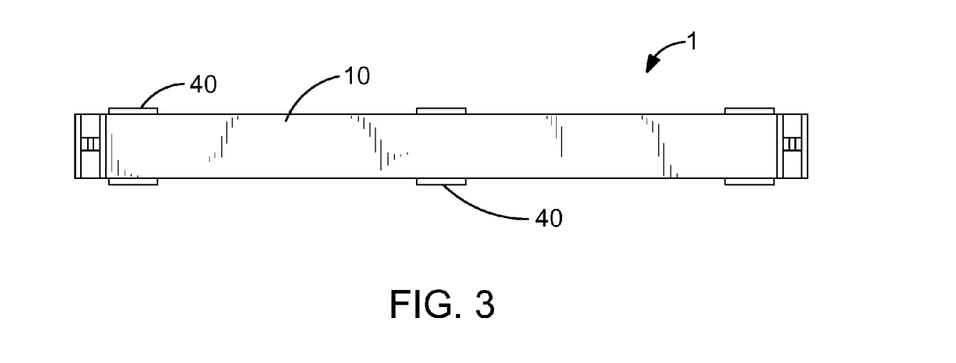
FIG. 3 is a top view of a load leveler in accordance with the present invention.

With reference to FIGS. 2-3, the load leveler 1 preferably includes a load support member 10, at least one vertical support member 12, two end vertical support members 14 and two adjustable stakes 16. Each vertical support member 12, 14 is located under the load support member 10 and preferably attached thereto with welding. The load support member 10 and the vertical support members 12, 14 are preferably fabricated from metal tubing. A cross support member 13 is preferably attached between two adjacent vertical support members 12. A cross support member 15 is preferably attached between adjacent vertical support members 12 and 14. The cross support members 13, 15 improve strength and rigidity of the load lever 1. A support foot 18, 20 is preferably attached to a bottom of each vertical support member 12, 14, respectively with welding or any suitable process. With reference to FIG. 2a, it is preferable that the vertical support members 12 be located, such that they rest on two I-beams 105 of the open semi-trailer 100.

Figure 6:
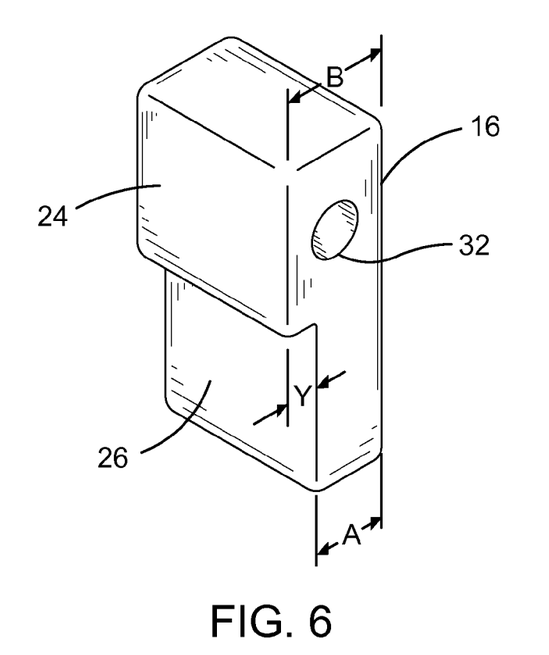
FIG. 6 is a perspective view of an adjustable stake of a load leveler in accordance with the present invention.
Figure 7:
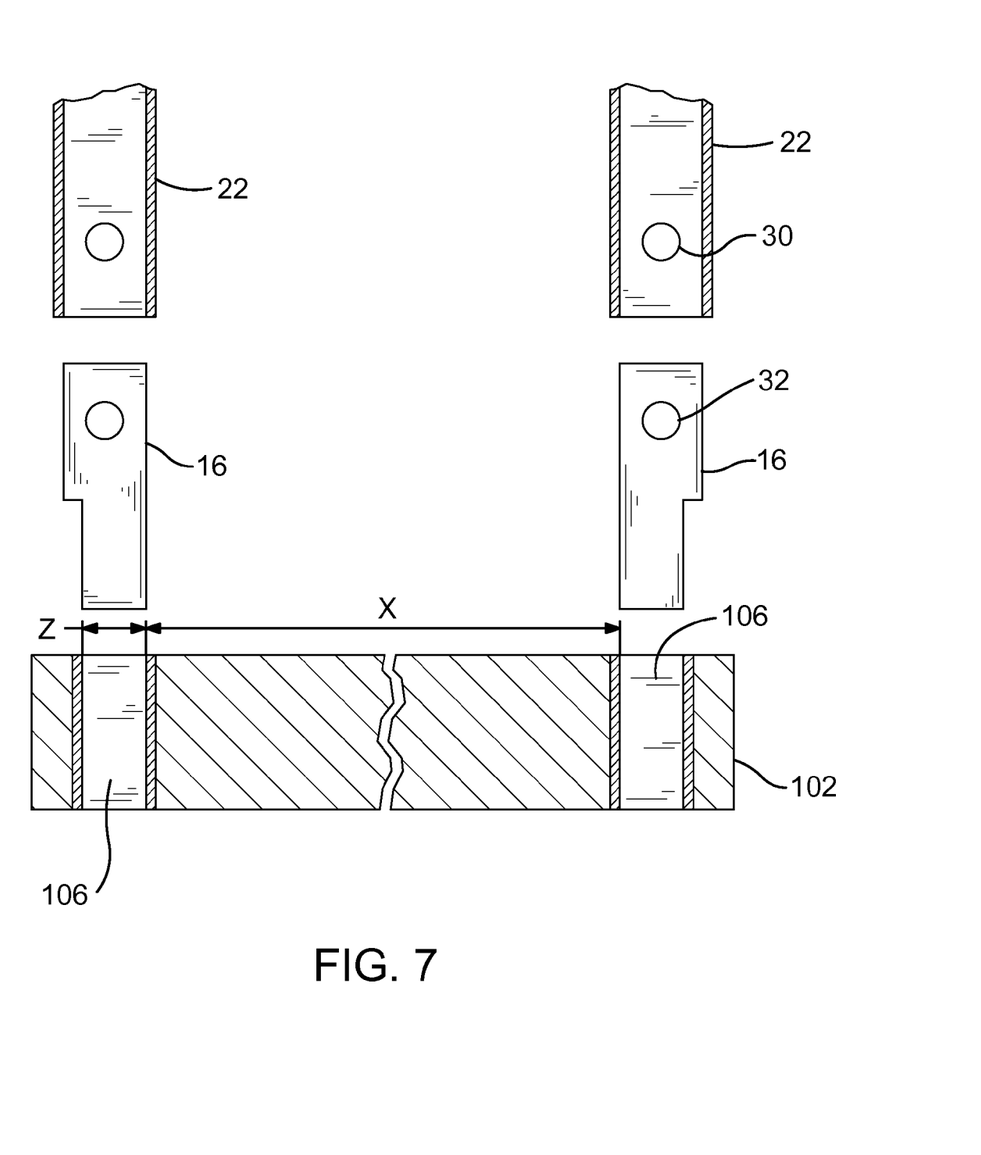
FIG. 7 is a cross sectional exploded front view of two receiver members with two adjustable stakes positioned to be inserted into stake pockets of an open semi-trailer with a minimum distance between the stake pockets in accordance with the present invention.

A stake receiver 22 is preferably attached to a side of the end vertical support member 14 with welding or any other suitable process. The stake receiver 22 is preferably fabricated from metal tubing. An inner perimeter of the stake receiver 22 is sized to receive an outer perimeter of the adjustable state 14. With reference to FIG. 6, the adjustable stake 16 includes a receiver portion 24 and a stake portion 26. The receiver portion is sized to be received by the stake receiver 22. With reference to FIG. 5, the stake portion 26 is sized to be received by the stake pocket 106 in the open semi-trailer 100. With reference to FIG. 7, the adjustable stake 16 is retained in the stake receiver 22 with a pin 28 inserted through a receiver pin hole 30 formed through the stake receiver 22 and a stake pin hole 32 formed through the receiver portion 24.

Figure 8:
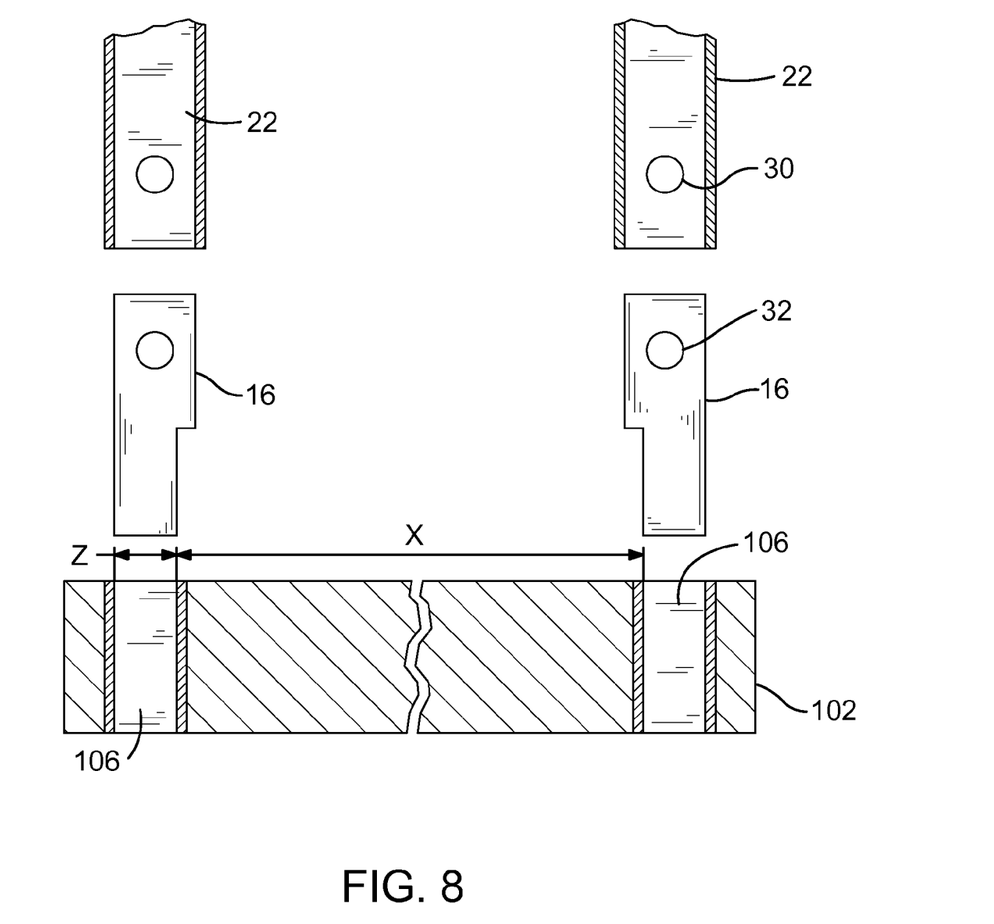
FIG. 8 is a cross sectional exploded front view of two receiver members with two adjustable stakes positioned to be inserted into stake pockets of an open semi-trailer with a maximum distance between the stake pockets in accordance with the present invention.

With reference to FIGS. 7-8, a width "A" of the stake portion 24 is smaller than a width "B" of the receiver portion 26. The difference between width "A" and width "B" is distance "Y." The distance "Y" is preferably ¼ inch to allow the load leveler 1 to be retained in any open semi-trailer. An inside width "Z" of the stake pocket 106 provides a clearance of Z—A between the stake pocket and the stake portion 26. It is preferable that the clearance of Z—A be at least ⅜ inch. Rotating both adjustable stakes 16, 180 degrees allows the distance between stake portion 26 to be adjusted to be 96.88 to 98.12.

Figures 9A, 9B, 9C:
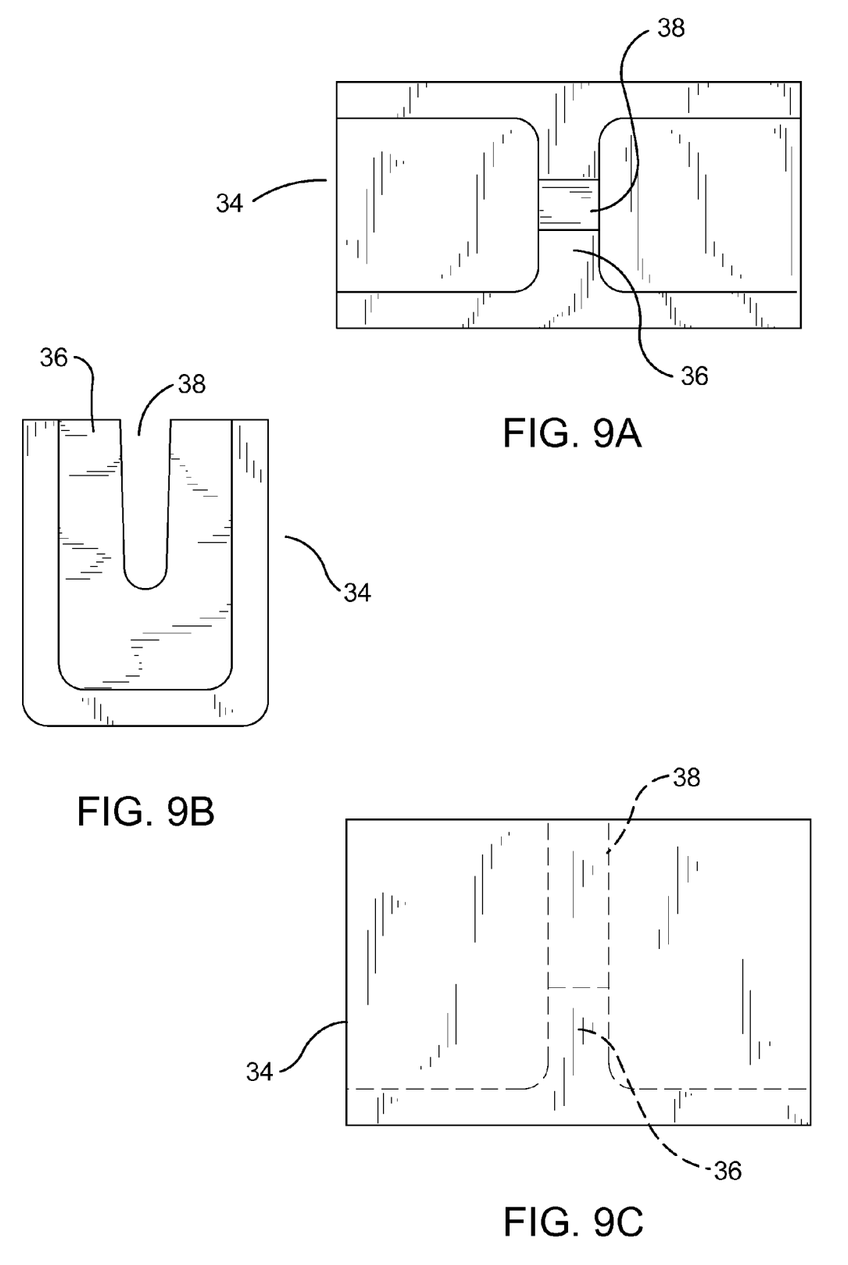
FIG. 9a is a top view of a chain tie of a load leveler in accordance with the present invention.
FIG. 9b is an end view of a chain tie of a load leveler in accordance with the present invention.
FIG. 9c is a side view of a chain tie of a load leveler in accordance with the present invention.

With reference to FIGS. 9a-9c, a chain tie 34 is preferably a casting. The chain tie 34 is preferably attached to a top of the stake receiver 22 with welding or any suitable process. The chain tie 34 preferably includes a U-shaped cross section with a web portion 36 formed in a middle of an inner perimeter of the U-shaped cross section. A chain slot 38 is formed in the web portion 36 to retain a chain 104. The chain 104 is inserted into the chain slot 38 and each end of the chain 110 is secured to the semi-trailer bed 102. The chain 104 is used to hold the adjustable stakes 16 of the load leveler 1 in the stake pockets 106. A plurality of beam guides 40 are preferably attached to opposing sides of the load support member 10 with welding or any suitable process. A support beam 110 is retained between the beam guides 40 for supporting a load placed on the load leveler 1. The support beam 110 is fabricated from a strong, yet resilient material, such as wood.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A load leveler for open semi-trailers, comprising:
   a load support member;
   a plurality of vertical support members being retained under said load support member; and
   two adjustable stakes, each one of said two adjustable stakes includes a receiver portion and a stake portion, said stake portion extends from said receiver portion, said receiver portion has a thickness which is different than said stake portion, said receiver portion is removably retained at a bottom of said load leveler at substantially each end thereof, fractional rotation of at least one of said two adjustable stakes changing a distance between said stake portions, wherein each one of said two stake portions are sized to be inserted into a stake pocket on a top of the open semi-trailer.

2. The load leveler for open semi-trailers of claim 1, further comprising: a stake receiver being attached to each end of said load leveler, a bottom of said stake receiver being sized to receive said receiver portion of one of said two adjustable stakes.

3. The load leveler for open semi-trailers of claim 2, further comprising:
   a chain tie being attached to a top of said stake receiver, said chain tie retaining a chain.

4. The load leveler for open semi-trailers of claim 1, further comprising:
   two of said plurality of vertical support members being positioned over two I-beams in a bed of the open semi-trailer.

5. The load leveler for open semi-trailers of claim 1, further comprising:
   a cross member being secured between two adjacent vertical support members of said plurality of vertical support members.

6. The load leveler for open semi-trailers of claim 1, further comprising:
   a plurality of beam guides being attached to opposing sides of said load support member to retain a support beam.

7. A load leveler for open semi-trailers, comprising:
   a load support member;
   a plurality of vertical support members being retained under said load support member;
   two adjustable stakes, each one of said two adjustable stakes includes a receiver portion and a stake portion, said stake portion extends from said receiver portion, said receiver portion has a thickness which is different than said stake portion, said receiver portion is removably retained at a bottom of said load leveler at substantially each end thereof, fractional rotation of at least one of said two adjustable stakes changing a distance between said stake portions, wherein each one of said two stake portions are sized to be inserted into a stake pocket on a top of the open semi-trailer; and
   means for retaining a chain is formed on substantially each end of said load leveler.

8. The load leveler for open semi-trailers of claim 7, further comprising: a stake receiver being attached to each end of said load leveler, a bottom of said stake receiver being sized to receive said receiver portion of one of said two adjustable stakes.

9. The load leveler for open semi-trailers of claim 8, further comprising:
   said means for retaining a chain is a chain tie, said chain tie being attached to a top of said stake receiver.

10. The load leveler for open semi-trailers of claim 7, further comprising:
    two of said plurality of vertical support members being positioned over two I-beams of the open semi-trailer.

11. The load leveler for open semi-trailers of claim 7, further comprising:
    a cross member being secured between two adjacent vertical support members of said plurality of vertical support members.

12. The load leveler for open semi-trailers of claim 7, further comprising:
    a plurality of beam guides being attached to opposing sides of said load support member to retain a support beam.

13. A load leveler for open semi-trailers, comprising:
    a load support member;
    a plurality of vertical support members being retained under said load support member; and two adjustable stakes, each one of said two adjustable stakes includes a receiver portion and a stake portion, said stake portion extends from said receiver portion, said receiver portion has a thickness which is different than said stake portion, said receiver portion is removably retained at a bottom of said load leveler at substantially each end thereof, wherein fractional rotation of at least one of said two adjustable stakes changing a distance between said stake portions for insertion into stake pockets on a top of open semi-trailers with different distances between the stake pockets.

14. The load leveler for open semi-trailers of claim 13, wherein:
a stake receiver being attached to each end of said load leveler, a bottom of said stake receiver being sized to receive said receiver portion.

15. The load leveler for open semi-trailers of claim 14, further comprising:
a chain tie being attached to a top of said stake receiver, said chain tie retaining a chain.

16. The load leveler for open semi-trailers of claim 13, further comprising:
a foot being attached to a bottom of each one of said plurality of vertical support members.

17. The load leveler for open semi-trailers of claim 13, further comprising:
a cross member being secured between two adjacent vertical support members of said plurality of vertical support members.

18. The load leveler for open semi-trailers of claim 13, further comprising:
a plurality of beam guides being attached to opposing sides of said load support member for retaining a support beam.

* * * * *